United States Patent [19]
Young

[11] Patent Number: 5,399,326
[45] Date of Patent: * Mar. 21, 1995

[54] PROCESS FOR NONCATALYTIC $NO_x$ ABATEMENT

[75] Inventor: Donald C. Young, Fullerton, Calif.

[73] Assignee: Union Oil Company of California, Los Angeles, Calif.

[*] Notice: The portion of the term of this patent subsequent to Nov. 16, 2010 has been disclaimed.

[21] Appl. No.: 96,186

[22] Filed: Jul. 26, 1993

Related U.S. Application Data

[63] Continuation of Ser. No. 957,668, Oct. 7, 1992, Pat. No. 5,262,138, which is a continuation of Ser. No. 400,935, Aug. 31, 1989, abandoned.

[51] Int. Cl.$^6$ .................. C01B 17/00; C01B 21/00; B01J 8/00
[52] U.S. Cl. .................................................. 423/235
[58] Field of Search .......................... 423/235, 239.1

[56] References Cited

U.S. PATENT DOCUMENTS

| | | | |
|---|---|---|---|
| 3,900,554 | 8/1975 | Lyon | 423/235 |
| 4,119,702 | 10/1978 | Azuhata et al. | 423/235 |
| 4,154,803 | 5/1979 | Uchikawa et al. | 423/239 |
| 4,208,386 | 6/1980 | Arand et al. | 423/230 |
| 4,212,853 | 7/1980 | Fukui | 423/235 |
| 4,325,924 | 4/1982 | Arand et al. | 423/235 |
| 4,508,558 | 4/1985 | Young | 71/30 |
| 4,626,417 | 12/1986 | Young | 423/235 |
| 4,719,092 | 1/1988 | Bowers | 423/235 |
| 4,756,890 | 7/1988 | Tang et al. | 423/235 |
| 4,777,024 | 10/1988 | Epperly et al. | 423/235 |
| 4,780,289 | 10/1988 | Epperly et al. | 423/235 |
| 4,863,704 | 9/1989 | Epperly et al. | 423/235 |

FOREIGN PATENT DOCUMENTS
WO8902781 4/1989 WIPO.

OTHER PUBLICATIONS
Japanese Patents Gazette, Section Ch: Chemical Abstract No. 34164B/18, Abstract of unexamined Japanese patent J54038-268, Derwent Publications Limited, Jun. 14, 1979, p. 12.

Primary Examiner—Gary P. Straub
Assistant Examiner—Thomas G. Dunn, Jr.
Attorney, Agent, or Firm—Yale S. Finkle; Gregory F. Wirzbicki

[57] ABSTRACT

$NO_x$ removal is accomplished by contacting a NOx-containing stream under reducing conditions with a urea-ammonia-water composition.

10 Claims, 3 Drawing Sheets

PROCESS FOR NONCATALYTIC $NO_x$ ABATEMENT

CROSS-REFERENCES TO RELATED APPLICATIONS

The application is a continuation of U.S. patent application Ser. No. 07/957,668, filed in the U.S. Patent and Trademark Office on Oct. 7, 1992, now U.S. Pat. No. 5,262,138, which is a continuation of U.S. patent application Ser. No. 07/400,935, filed in the U.S. Patent and Trademark Office on Aug. 31, 1989, and now abandoned.

FIELD OF THE INVENTION

This invention relates to the removal of oxides of nitrogen ($NO_x$) from gaseous stream. In one of its more particular aspects this invention relates to a process for achieving lower $NO_x$ levels using liquid solutions which are safe and easy to handle.

BACKGROUND OF THE INVENTION

Nitrogen oxides play an important role in smog formation and otherwise contribute to the pollution of the atmosphere. The removal of nitrogen oxides from exhaust gases of various kinds has been the goal of many different types of chemical processes which treat such gases. Power plant stack gases, for example, have been treated in various ways prior to venting to the atmosphere. With the recent government regulation of air quality, the need for removing pollutants such as $NO_x$ from gases released to the atmosphere has increased considerably.

Among the processes which have previously been used for $NO_x$ removal are thermal and catalytic reduction, especially selective catalytic reduction utilizing noble metal and base metal catalysts, absorption in scrubbing solutions, for example, EDTA and ferrous ion-containing solutions, and the use of molecular sieves.

One method which is used extensively is the selective reduction of $NO_x$ with ammonia ($NH_3$) to form $N_2$ and $H_2O$. Although effective, the possibility of chemical spills in the transportation of anhydrous ammonia has raised growing concern because of the volatility and corrosive nature of this toxic material. It would be desirable to minimize the risk of injury from $NH_3$ spills while still retaining the capability of using the reducing power of ammonia in $NO_x$ abatement. Urea has also been used as a $NO_x$ reductant. However, urea, which is a solid presents handling problem as well.

SUMMARY OF THE INVENTION

The present invention provides a process for $NO_x$ abatement which utilizes as a reductant a composition comprising urea, ammonia and water. The process preferably comprises contacting under reducing conditions a $NO_x$-containing gaseous stream with a composition consisting essentially of urea, ammonia and water.

The use of such compositions substantially eliminates problem connected with chemical spills of ammonia, while providing the advantages inherent in the use of ammonia in $NO_x$ abatement as well as other advantages. Compositions comprising urea, ammonia and water can be furnished as low volatility solutions which are stable under transport conditions. Upon being subjected to $NO_x$-reducing conditions, both the urea and the ammonia react with oxides of nitrogen to provide $NO_x$-reducing capacity. At elevated temperatures urea is also converted quantitatively to ammonia. In addition, the urea acts catalytically to promote reaction between $NO_x$ and ammonia. Thus, the process of the present invention is more effective for $NO_x$ abatement and safer than using either ammonia or urea alone.

DESCRIPTION OF THE PREFERRED EMBODIMENTS

It has now been found that mixtures of urea, ammonia and water are more effective $NO_x$ reductants than either urea or ammonia used separately. Furthermore, mixtures of urea, ammonia and water are effective over wider temperature ranges and wider ranges of residence times than either ammonia or urea, whether anhydrous or in aqueous solution. The reason for this unexpected effectiveness is not clear. However, it appears that urea may act as a catalyst for the reaction between $NO_x$ and ammonia. It is known that urea can be hydrolyzed at elevated temperatures to form ammonia and carbon dioxide. However, since more ammonia is produced from urea when ammonia is present than when it is not, it is apparent that interaction between urea and ammonia is responsible for the increased ammonia production. This could account for the greater effectiveness of $NO_x$ abatement by mixtures of urea, ammonia and water than by urea or ammonia solutions alone.

Urea-ammonia-water compositions can be used in $NO_x$ reductions with high rates of conversion of nitrogen oxides to nitrogen and water without having to face any of the problems involved in the handling of anhydrous ammonia or solid urea.

$NO_x$, which consists mainly of NO and $NO_2$, is converted to nitrogen and water in accordance with the following reactions:

$8NH_3 + 6NO_2 \rightarrow 7N_2 + 12H_2O$ (Reaction 1)

$4NH_3 + 6NO \rightarrow 5N_2 + 6H_2O$ (Reaction 2)

Urea is hydrolyzed to ammonia at elevated temperatures in accordance with the following equation:

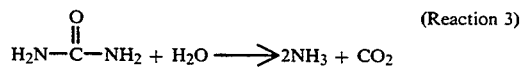

$$H_2N-\underset{\underset{\|}{O}}{C}-NH_2 + H_2O \rightarrow 2NH_3 + CO_2 \quad \text{(Reaction 3)}$$

Certain urea-ammonia-water compositions of relatively high total nitrogen content and relatively high boiling point have been found to have unexpectedly low temperatures of crystallization. Specifically, urea-ammonia-water compositions of total nitrogen content between about 25 and about 40 weight percent and especially between about 30 and about 37 weight percent have substantially lower temperatures of crystallization than expected while also having relatively high boiling points. Such urea-ammonia-water compositions, which comprised especially preferred embodiments of the reductant of the present invention, are described in detail in U.S. Pat. No. 4,508,558, the disclosure of which is incorporated herein by reference in its entirety.

Figure 1:
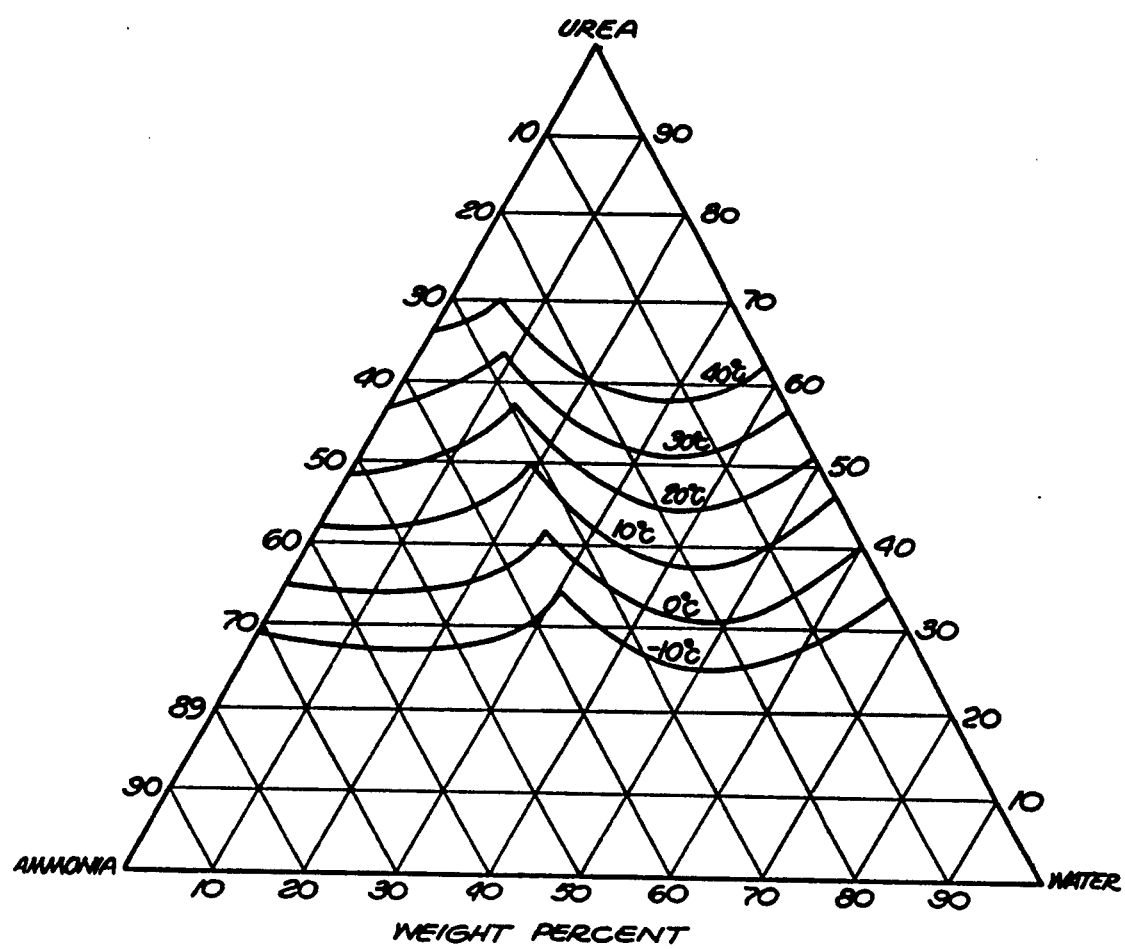
FIG. 1 is a ternary composition diagram of the urea-ammonia-water system showing the solubility characteristics thereof at various temperatures as reported by E. A. Worthington, R. C. Datin, and D. P. Schutz, Industrial and Engineering Chemistry, p. 911, (April, 1952).

FIG. 1 of the accompanying drawing depicts a ternary composition diagram of the urea-ammonia-water system presented by Worthington, Datin and Schutz in "Physical Properties of Ammonia Solutions," Industrial and Engineering Chemistry, p. 911 (April 1952). As shown in this diagram, as the various isothermal crystallization curves move from right to left and away from the urea-water ordinate in the direction of increasing total nitrogen content, the curves first reach minimum values, then rise toward inflection points, and finally fall off towards the urea-ammonia ordinate. The crystallization curves set forth in FIG. 1 present a dilemma. In the regions where crystallization and "salting out" problems are minimized, i.e., generally in the left-hand portion of the diagram, and especially in the areas directly under the inflections, it is known that vapor pressures are unacceptably high, so that solutions of compositions defined by concentrations falling within these regions would require heavy gauge handling materials and would boil upon exposure to the atmosphere, for example, when held in a tank open to the atmosphere. On the other hand, where the vapor pressures are known to be more favorable, i.e., generally in the right-hand portion of the diagram, Worthington et al. predict that the worst solubility conditions exist, and that "salting out" problems will be encountered, with the problems being most acute in the region where the curves reach minimum values.

Figure 2:
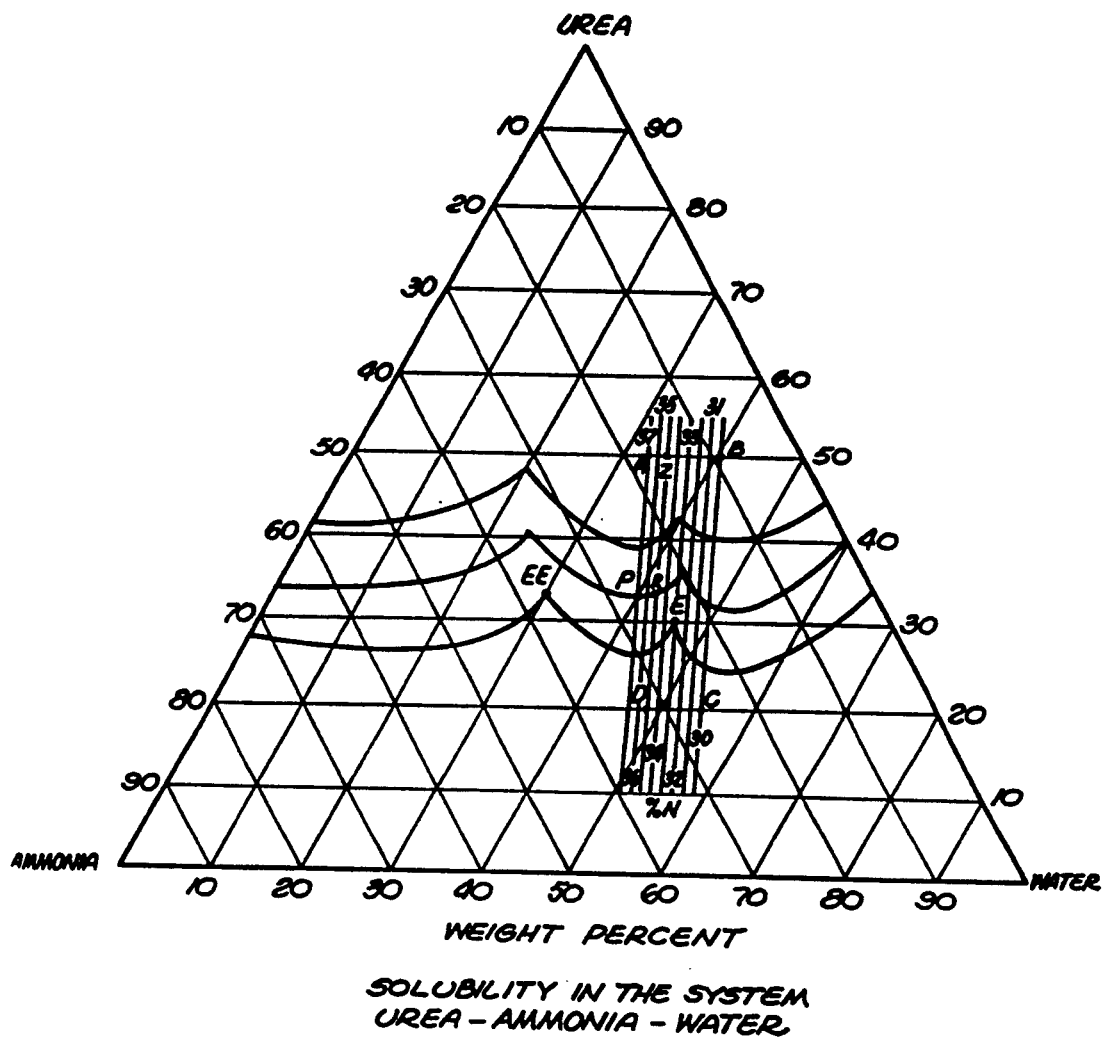
FIG. 2 is a ternary composition diagram of the urea-ammonia-water system illustrating the depression in crystallization temperatures for 30 to 37 weight percent total nitrogen urea-ammonia-water compositions. Shown in FIG. 2 are crystallization isotherms at $+10°$ C., $0°$ C. and $-10°$ C., with the isotherm curves between the constant total nitrogen lines of 30 and 37 weight percent being based on data derived experimentally at atmospheric pressure.
Figure 3:
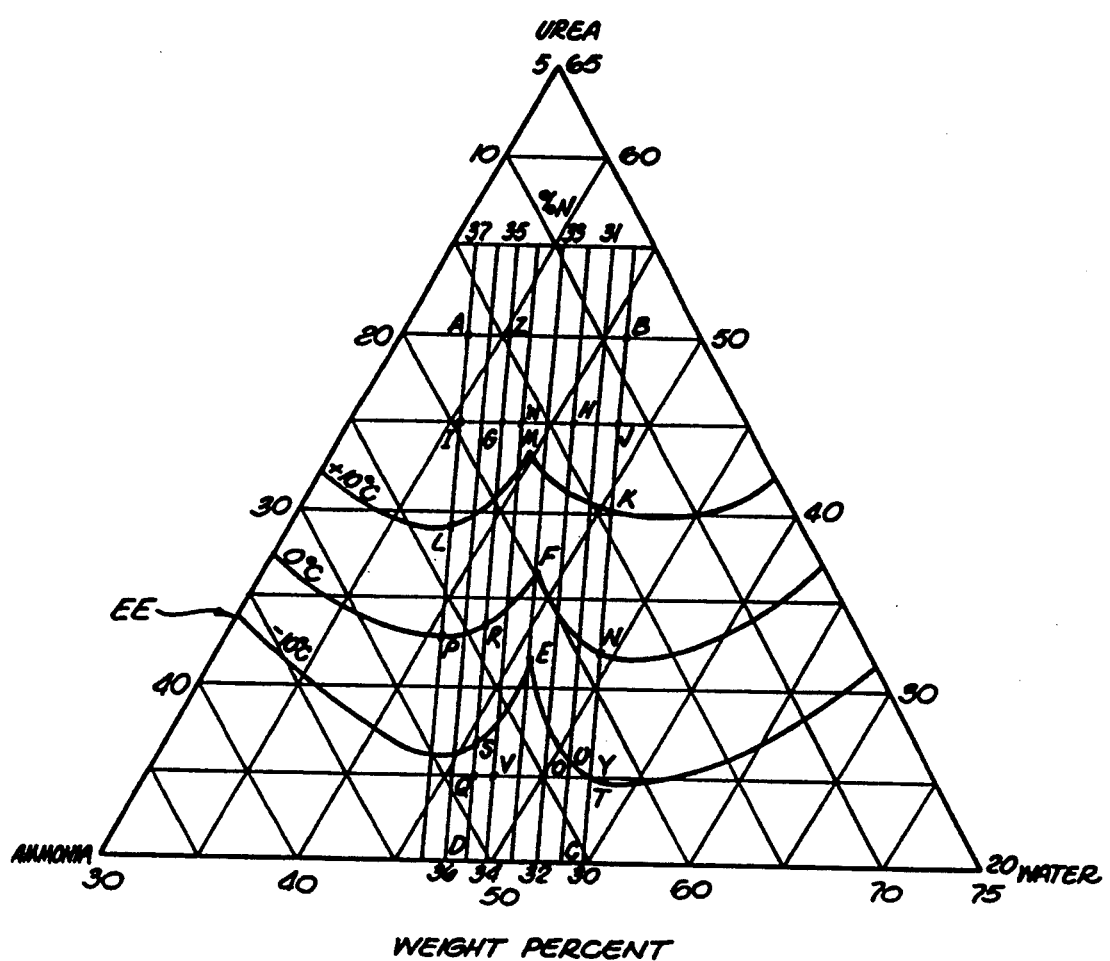
FIG. 3 is a magnification of a portion of the ternary composition diagram shown in FIG. 2, with points A, B, C, D, P, R and Z denoting identical compositions in both figures.

As shown in FIG. 2 of the drawing, the crystallization temperatures of urea-ammonia-water compositions of about 30–37 weight percent total nitrogen content are depressed. This phenomenon is shown as a second family of inflections beginning at a total nitrogen content of about 30 weight percent. The maximum values in these inflections, reflecting the greatest depression in crystallization temperature, lie generally in that area of the ternary diagram where the total nitrogen content is between about 30 and 37 weight percent, especially between about 32 and 35 weight percent. For many compositions, the maximum values of the inflections fall upon or close to the value of 33 weight percent total nitrogen as shown in FIGS. 2 and 3.

The family of inflections referred to above is of most interest and importance when the urea-ammonia-water composition contains between 20 and 50 weight percent urea, and between 10 and 40 weight percent ammonia, such compositions having both crystallization and vapor pressure properties conducive to maintaining a relatively high total nitrogen content composition in the liquid state over wide ranges of ambient conditions. Preferred compositions which can be used in the process of the present invention comprise urea, ammonia, and water, with a urea content between 20 and 50 weight percent and an ammonia content between 10 and 40 weight percent, with the balance being water. Such compositions have a total nitrogen content from about 25 to about 40 weight percent, preferably about 30 to about 37 weight percent, and most preferably about 32 to about 35 weight percent. Crystallization temperatures are at or above 0° C. when the total nitrogen content is above about 35 weight percent. These compositions generally fall within the area defined by lines PA, AB, BC, CD and DR, and curve RP of the urea-ammonia-water ternary diagrams shown in FIGS. 2 and 3. The temperature differential between the crystallization and boiling point temperatures of these compositions allows for their use in an essentially completely liquid form throughout a wide range of conditions. Thus, compositions useful in the present invention can be stored in closed vessels over a wide range of temperatures. For example, compositions having a total nitrogen content between about 25 and 40 weight percent total nitrogen can be stored without encountering crystallization problems or inducing superatomspheric pressures within closed vessels. Alternatively, such compositions may be stored in open vessels or otherwise subjected to an environment wherein atmospheric pressure prevails. These compositions therefore have crystallization and vapor pressure properties of special usefulness in the transportation, storage, and use as $NO_x$ reductants.

Moreover, liquid urea-ammonia-water compositions can be prepared by a method wherein advantage is taken of the exothermic heat generated by the dissolution of gaseous ammonia to aid in dissolving solid urea. Since the dissolution of ammonia into aqueous media involves exothermic reactions, ordinarily cooling equipment such as condensers and the like are required for the preparation of aqueous ammonia solutions. On the other hand, urea-water reactions are highly endothermic, and consequently, the preparation of aqueous liquid urea solutions ordinarily requires heating means such as boilers and the like. In preparing solutions for use as reductants in the process of the present invention, however, the need for heating and/or cooling equipment is minimized or eliminated, as the ammonia and urea may be added simultaneously in amounts such that both dissolve under essentially isothermal temperature conditions or within an acceptable range of temperature increases or decreases, thereby requiring a minimum of added energy expenditure for heating and/or cooling. In some cases, no added energy is required to effect the dissolution of the ammonia and/or urea components to form the compositions of the invention.

The depressed crystallization temperatures of urea-ammonia-water compositions of 25 to 40 weight percent total nitrogen content significantly expands the temperature range in which the liquid state may be maintained, thereby providing a definite economic advantage.

When preparing urea-ammonia-water compositions useful in the present invention, it is possible to admix an aqueous ammonia solution of sufficient ammonia content and an aqueous urea solution of sufficient urea content such that the resulting urea-ammonia-water composition has a desired total nitrogen content within the preferred range. Such a method, however, cannot be performed under ambient conditions. Either the ammonia solution must be under pressure or the urea solution heated, or both, to produce the desired urea-ammonia-water compositions. Moreover, this method suffers from an unfavorable energy balance. As pointed out above, the aqueous ammonia solution admixed with the urea solution is generally prepared with cooling means to control the exothermic heat generated by the dissolution of ammonia in water, while the preparation of the aqueous urea solution generally requires a boiler or other heat source to promote the dissolution of urea into water, an endothermic reaction. In the method of preparation preferred for forming urea-ammonia-water solutions useful in the present invention, gaseous anhydrous ammonia and solid urea are simultaneously dissolved into an aqueous reaction medium, so that one may take advantage of the exothermic nature of the ammonia-water dissolution to aid the dissolution of urea. Taking this concept one step further, one may so adjust the amounts of urea and ammonia being simultaneously dissolved that the dissolution proceeds in part or totally under isothermal or essentially isothermal conditions. For instance, urea and ammonia can be dissolved simultaneously and isothermally in an aqueous reaction medium over a time period sufficient to increase the total nitrogen content of said medium by 10 weight percent, often by 15 weight percent. Ordinarily, however, it is not necessary to control the temperature conditions to truly isothermal conditions, or even to an approximation of isothermal conditions. Usually, so long as, during admixing, the temperature of the admixed ingredients does not vary by more than about 20° C. from the initial temperature (usually the ambient temperature), the need for cooling and/or heating equipment may be minimized or avoided. In fact, variance of the temperature of the admixed ingredients from the initial by no more than about 10° C., and more preferably by no more than about 5° C., can be realized by alternately contacting the aqueous reaction medium (usually water or an aqueous solution of urea and/or ammonia) with anhydrous ammonia and then solid urea, with all or a substantial proportion of the heat required for urea dissolution being provided by the previous dissolution of ammonia, and with the amounts of dissolved urea and ammonia being controlled so that the reaction temperature fluctuates within the predetermined range. In addition, the foregoing preparation methods can be modified by supplemental additions of aqueous ammonia and/or aqueous urea to the reaction medium, but due to the unfavorable energy balance in producing aqueous urea and aqueous ammonia, such supplemental additions are preferably minimized, as are supplemental additions of heat and/or cooling energy.

Anhydrous ammonia, which is frequently used in $NO_x$ abatement, is corrosive and toxic. The transportation of anhydrous ammonia, as pointed out above, is undesirable and may be subject to governmental restrictions. It is estimated that an anhydrous ammonia spill from a 40,000 pound truck trailer would generate an average footprint of 29 acres, that is, an area of 29 acres in which the concentration of ammonia would be 0.5 percent or higher, i.e. lethal. Although aqueous ammonia could be utilized instead of anhydrous ammonia, the risk of injury being far less than from anhydrous ammonia, the activity of aqueous ammonia is lower than that of anhydrous ammonia. Aqueous ammonia has only a 29 percent ammonia equivalent. Consequently, transportation of aqueous ammonia involves transporting large quantities of water.

Urea, although it has a 53 percent ammonia equivalent, is extremely difficult to handle, being a solid. Aqueous urea, on the other hand, which is easier to handle than solid urea, has an ammonia equivalent of only 27 percent. Transportation of aqueous urea also involves transporting large quantities of water.

Urea-ammonia-water compositions useful in the present invention display ammonia equivalents in the range of 30 to 60 percent making their use as replacements for anhydrous gaseous ammonia feasible. Transportation of these urea-ammonia-water compositions involves transporting less water than in the case of aqueous ammonia or aqueous urea.

One such urea-ammonia-water composition which is particularly useful in the process of the present invention contains 30 percent urea, 23 percent ammonia and 47 percent water. This composition corresponds to the point E on the graph shown in FIGS. 2 and 3. It is particularly preferred because it has a relatively high ammonia equivalent of 39 percent and can be handled safely. The risk of injury from a spill of this composition is less than seven thousandths the risk of a spill of anhydrous ammonia. Another composition which has proved effective in the process of the present invention is a mixture containing 33 percent urea, 37 percent ammonia and 30 percent water. It corresponds to the point EE in FIGS. 2 and 3. This alternative, however, is less attractive than the 30 percent urea, 23 percent ammonia and 47 percent water composition (Point E) because, although providing an ammonia equivalent of 55 percent, it presents handling problems, since it boils at room temperature.

In general, any mixture of urea, ammonia and water can be used in the practice of the present invention. For example, molar ratios of urea to ammonia of about 0.5:1 to about 2.5:1 and preferably about 1:1 to about 2:1 can be used. Preferred, however, as discussed above are those compositions having total nitrogen contents of about 25–40 weight percent. Total nitrogen contents of about 30–37 weight percent are more preferred. Total nitrogen contents of about 32–35 weight percent are most preferred. Especially preferred compositions are depicted in FIGS. 2 and 3 as falling within the area defined by lines PA, AB, BC, CD and DR, and curve RP of the urea-ammonia-water ternary diagrams.

Processes for contacting $NO_x$-containing streams of various types with ammonia or urea, but not with urea-ammonia-water compositions as in the present invention, are described in U.S. Pat. Nos. 3,900,554; 4,119,702; 4,154,803; 4,212,853; 4,325,924; 4,719,092; 4,756,890 and 4,780,289, the disclosures of which are incorporated herein by reference in their entirety. The contacting processes described in the above listed patents are generally applicable to the process of the present invention utilizing urea-ammonia-water compositions as the contacting agents.

Contacting with urea-ammonia-water compositions is most effectively accomplished by atomization of the urea-ammonia-water composition into the $NO_x$-containing stream. In this manner, the urea present in the composition is converted into an aerosol which can function as a fluidized bed catalyst to promote the reaction between $NO_x$ and ammonia. Urea particles are excellent adsorbents for ammonia and for $NO_x$ and effectively catalyze the reaction between adsorbed ammonia and adsorbed oxides of nitrogen. Depending upon the temperature of the $NO_x$-containing stream, urea can itself react with oxides of nitrogen or, at elevated temperatures of about 200°–1000° C., serve as an ammonia precursor.

Temperatures in the range of room temperature to about 1000° C. are effective in carrying out the process of the present invention. Temperatures below about 1000° C. are preferred.

Where elevated temperatures are involved, the urea, in addition to functioning as a surface catalyst, is hydrolyzed to ammonia, thereby providing additional ammonia for reaction with the oxides of nitrogen which are present. Thus, urea in admixture with ammonia and water serves at least three purposes which enhance the removal of nitrogen oxides from $NO_x$-containing gas stream.

1. Urea catalyzes the reaction of ammonia with oxides of nitrogen to produce nitrogen and water.
2. Urea itself reacts with oxides of nitrogen to produce innocuous reaction products.
3. Urea undergoes hydrolysis and/or thermolysis to produce ammonia which reacts with oxides of nitrogen to produce nitrogen and water.

The invention will be better understood by reference to the following examples which are included for purposes of illustration and are not to be construed as in any way limiting the scope of the invention, which is defined in the appended claims.

EXAMPLE 1

Aqueous urea and aqueous urea and ammonia mixtures were thermolyzed by injection with a syringe pump into one end of a hot tube. The tube was packed with quartz beads for better heat transfer. Thermocouples were placed at intervals along the tube to monitor the temperature variation. Flowing nitrogen was used as a carrier gas. Urea and mixtures of urea and ammonia were added at 500 ppm ammonia equivalents to the nitrogen stream. The gases exiting the tube were bubbled through a sulfuric acid trap to collect any ammonia formed. The concentration of ammonia was determined by back titration with a sodium hydroxide solution. The results are shown in Table 1 for urea alone and in Table 2 for a mixture of urea and ammonia.

TABLE 1

|  | % Yield of Ammonia from Urea Temperature, °C. | |
| --- | --- | --- |
| Residence Time, sec. | 600 | 700 |
| 43 | 29 | 22 |
| 86 | 80 | 1 |
| 171 | 100 | 17 |

TABLE 2

|  | % Yield of Ammonia from Urea and Ammonia Temperature, °C. | |
| --- | --- | --- |
| Residence Time, sec. | 600 | 700 |
| 43 | 51 | 41 |
| 86 | 80 | 27 |
| 171 | 102 | 40 |

It can be seen from these data that, in general, higher yields of ammonia are obtained from the thermolysis of urea where ammonia is also present initially than from urea without ammonia being present. The effect Is most pronounced with lower residence times at lower temperatures. Apparently the presence of ammonia does not increase the yield of ammonia from urea as the residence time is increased. In contrast, at higher temperatures, the effect of increased yield of ammonia when ammonia is present with the urea increases as the residence time is increased from 43 to 86 seconds and then levels off as the residence time is increased further to 171 seconds.

The process of the present invention is effective to convert $NO_x$ to nitrogen and water in higher yields than can be obtained by the use of either ammonia or urea alone. Problems connected with handling of anhydrous ammonia and solid urea are substantially eliminated by utilizing compositions containing urea, ammonia and water, especially those having the concentrations described above.

The invention may be embodied in other forms without departure from the spirit or essential characteristics thereof. Consequently, the present embodiments and examples are to be considered only as being illustrative and not restrictive, with the scope of the invention being defined by the appended claims. All embodiments which come within the scope and equivalency of the claims are therefore intended to be embraced therein.

I claim:

1. A process for removing $NO_x$ from a gas stream having a temperature between about 800° C. and about 1000° C. which process comprises injecting into said $NO_x$-containing gas stream a liquid composition comprising urea, ammonia and water in which composition the mole ratio of urea-to-ammonia is about 0.55, wherein $NO_x$ is reduced in said gas stream.

2. A process as defined by claim 1 wherein said liquid composition is atomized into said gas stream.

3. A process as defined by claim 1 wherein said liquid composition consists essentially of said urea, said ammonia, and said water.

4. A process as defined by claim 1 carried out in the absence of an $NO_x$ reduction catalyst.

5. A process as defined by claim 3 carried out in the absence of an $NO_x$ reduction catalyst.

6. A process as defined by claim 1 wherein said liquid composition comprises between about 0.10 and about 50 weight percent urea and between about 0.10 and about 40 weight percent ammonia and is atomized into said $NO_x$-containing gas stream.

7. A process as defined by claim 1 wherein said $NO_x$-containing gas stream is a power plant stack gas.

8. A process as defined by claim 1 wherein the total nitrogen content of said liquid composition due to dissolved urea and dissolved ammonia exclusively is between about 25 and about 40 weight percent.

9. A process as defined by claim 1 wherein said $NO_x$-containing gas stream is an exhaust gas from a chemical process.

10. A process as defined by claim 1 wherein said liquid composition contains between about 0.10 and about 50 weight percent urea and between about 0.10 and about 40 weight percent ammonia.

* * * * *